United States Patent Office 3,425,083
Patented Feb. 4, 1969

3,425,083
APPARATUS FOR AUTOMATICALLY CLEANING AN ENDLESS PIPE
Fritz Johan Wennerberg, and Jarl Eilif Gullaksen, Lund, Sweden, assignors to Alfa-Laval AB, Tumba, Sweden, a corporation of Sweden
Filed July 6, 1966, Ser. No. 563,215
Claims priority, application Sweden July 12, 1965, 9,145/65
U.S. Cl. 15—104.06                6 Claims
Int. Cl. F28g 9/00; B08b 9/04; F16l 45/00

ABSTRACT OF THE DISCLOSURE

An endless pipe has a bent form allowing a cleaning member to circulate constantly through the pipe and past its inlet and outlet for a liquid medium, the outlet having a smaller capacity than the inlet so that part of the liquid medium is returned from the outlet through a return portion of the pipe to and past the inlet for recycling; and means are provided for supplying the liquid medium under pressure to the inlet to cause the cleaning member to be pushed through the pipe from said return portion, the return flow through the latter portion being preferably effected by an ejecting action.

The Disclosure

Figure 1:
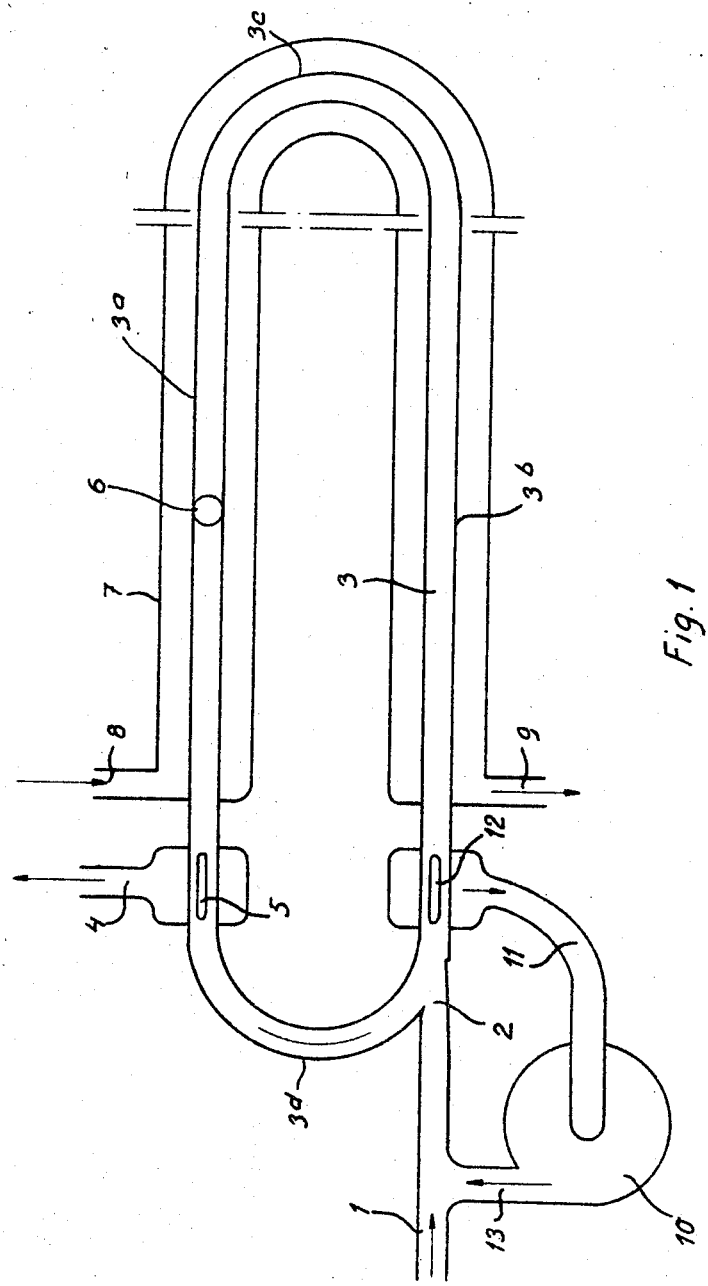

This invention relates to apparatus for automatically cleaning an endless pipe. The invention will be described with reference to a heat exchanger, although the invention is not limited to that embodiment.

Many liquids which in the food industry must be heated for pasteurization or sterilization (such as milk, meat extracts and glue water) give rise to problems, because when they are heated certain constituents, such as proteins, are precipitated. On indirect heating, the heat transmitting surfaces or walls become covered with a deposit of such constituents, usually resulting in poor thermal conductivity. The heat transferability of the heat exchanger is thus impaired, the flow resistance is increased, and the channels of the heat exchanger may eventually be completely clogged. At the same time, the deposit is heated to a substantially higher temperature than the liquid, which can cause the product to deteriorate, for instance, by way of a bad taste or a reduced nutritive value. Other disadvantages are that the deposit may come loose and pollute the product. Moreover, for these reasons such a plant cannot be kept in operation longer than one to two or at the most six hours before the operation has to be stopped for cleaning of the plant.

The above-noted disadvantages may be avoided by direct heating, the heating medium such as steam being led directly into and mixed with the product. However, this causes complications of a different kind, that is, as to hygiene and concentration. Also, two separate heat exchangers may be used alternately, one of them being in operation while the other is being cleaned. This means, in turn, a complication of the operation and an increase of the cost of the plant because of the doubling of the equipment.

An object of the present invention is to eliminate these disadvantages and to provide for automatically cleaning an endless pipe, such as a part of a heat exchanger, so that, in the case of a heat exchanger, it can be kept in operation practically for an unlimited time. The term "automatically cleaning" is to be understood as meaning that every tendency to deposition on the hot surface is prevented, and if a deposit is formed it is removed immediately and thus at such an early stage that the loosened deposit can disperse and again be dissolved in the product without affecting it in any noticeable way.

An apparatus according to the invention conveys one or more cleaning members in the pipe by a medium flowing through it, the medium being supplied to and removed from the pipe through inlets and outlets, respectively, which are arranged to prevent the cleaning member or members from passing out therethrough. The characterizing feature of the present apparatus is such that the cleaning member or members and a portion of said medium are caused to circulate constantly through the endless pipe, passing the outlet and the inlet for the medium, by an ejecting effect and/or the pressure exerted by flowing of the medium.

The apparatus of the present invention, such as a heat exchanger, comprises an endless pipe and is characterized in that the endless pipe has a bent form, such as to allow the cleaning member or members to circulate constantly within the pipe, passing the outlet and the inlet (each or either of which may be formed as a nozzle) and being pushed forward by a liquid entering under pressure.

Other characterizing features of the present invention will be apparent from the appended claims.

Figure 2:
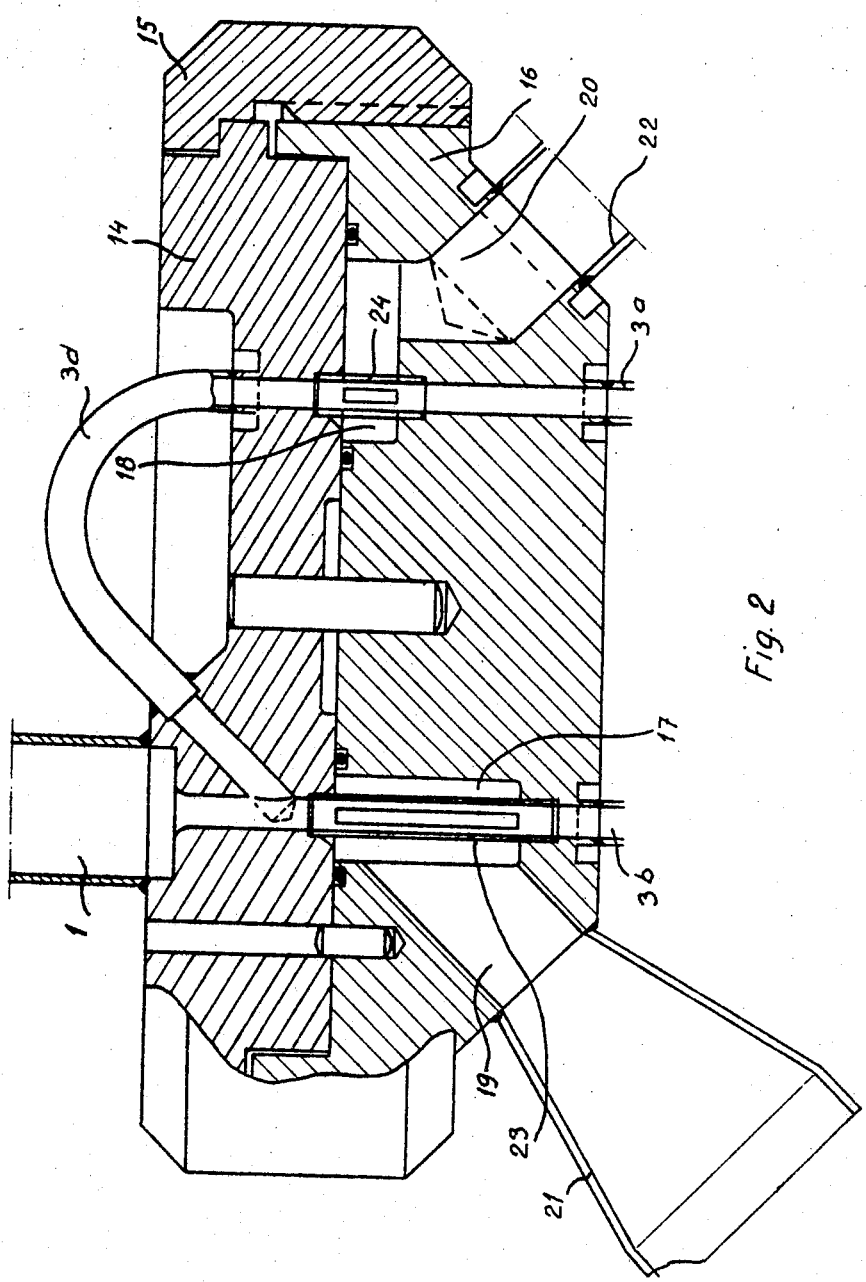

One embodiment of the present invention is shown in the accompanying drawings, in which FIG. 1 shows diagrammatically a heat exchanger with associated means, FIG. 2 being a sectional view of part of the same heat exchanger as arranged in practice.

Referring to FIG. 1, the liquid to be treated in the heat exchanger is supplied under pressure through a conduit 1, passes a nozzle 2 and flows from there in the longitudinal direction of the endless pipe 3 to an outlet 4 through which a portion of the liquid leaves. Pipe 3 has slots 5 leading to a housing surrounding them, which housing forms the outlet 4. Within pipe 3 is at least one cleaning member 6, shown in the form of a ball with a diameter nearly equal to that of pipe 3. Each cleaning member 6 may be provided with grooves or projections in order to provide a better scraping action against the inside wall of the pipe, when the cleaning member is transported together with the liquid through the pipe. In the illustrated example, the pipe has two parallel parts 3a and 3b, which are connected to each other by means of semi-circular pipe bends 3c and 3d. The bend 3d passes nozzle 2 in a way such that the ball 6, without being hindered, can pass the nozzle and continue its circulation through the pipe. Parts 3a, 3b and 3c of the pipe are surrounded by a housing 7 which is provided with an inlet 8 and an outlet 9 for a heating medium, usually steam.

Nozzle 2 is shown tapering in the direction of flow, although it may be made substantially cylindrical.

The flow of liquid from nozzle 2 is forced at high velocity through pipe parts 3b, 3c and 3a. A portion of the liquid leaves pipe part 3a through slots 5, while the rest together with ball 6 passes through bend 3d back to the nozzle. The liquid supplied through the nozzle has a drawing ejector-effect on this residual liquid and on the ball, until the ball is carried away by the stream of liquid entering through the nozzle, the ball then completing a new circuit through the pipe. Slots 5 or other perforations in the pipe must be small enough so that each ball 6 is unable to pass through them.

When passing through the pipe, the ball 6 scrapes away all the deposit as soon as it is formed on the wall of the pipe. When the deposit is first formed, it is usually soft and is easily removed. The loosened soft deposit is then dispersed or dissolved in the liquid.

If the flow velocity of the liquid in pipe 3 is not high enough, an auxiliary circulation pump 10 may be inserted, which draws liquid through a conduit 11 from slots 12 in pipe 3, these slots being located beyond nozzle 2. Pump 10 forces this liquid through a conduit 13 into conduit 1 in advance of nozzle 2. Thus, considerably more liquid will be injected through nozzle 2 into pipe 3, resulting in a higher velocity. The flow of liquid through the auxiliary pump 10 may be several times greater than the amount of liquid treated in the heat exchanger per unit of time.

Generally, a short holding time is desired for the liquid in the heat exchanger at the high temperature, in which case the apparatus should have a large heating surface in relation to the volume. This means that conduit 3 should have small dimensions. In test runs which have given good results, the total length of the pipe 3 was 4 meters, the internal diameter of the pipe was 6 mm. and the amount of treated liquid (milk) was 200 liters per hour. In plants for larger capacities, a number of pipes are connected in parallel and are provided with a common inlet and outlet and a common housing for the heating medium. Also, the auxiliary circulation pump 10 may be common for all the pipes.

FIG. 2 shows an arrangement of one part of a heat exchanger according to the present invention in which several pipes are connected in parallel, but the fastening of only one such pipe in an end piece is shown.

Conduit 1 for the liquid to be treated as well as part 3d of the endless pipe are fastened in an end piece 14 which, by means of a ring nut 15, is arranged to be clamped to another end piece 16. In end piece 16, parts 3a and 3b of the endless pipe 3 are fastened so that, when the end pieces are clamped together, these parts are placed opposite to and in communication with corresponding parts of the pipe in end piece 14. In end piece 16, chambers 17 and 18 are provided, the former of which connects pipe part 3b with conduit 1, and the latter of which connects pipe part 3a with pipe part 3d. The chambers 17 and 18 are provided with outlet channels 19 and 20, respectively, in end piece 16, to which channels outlet studs 21 and 22, respectively, are connected.

In chambers 17 and 18, floating perforated tube pieces 23 and 24, respectively, are inserted so that the ends of these tube pieces extend into corresponding recesses in the opposed end pieces 14 and 16. Gaskets and guiding means are arranged in suitable places in order to guide and seal the end pieces 14 and 16.

The cleaning members 6 may consist of steel, rubber or Teflon. In the sterilization of milk, cleaning members consisting of styrene rubber have proved to be especially suitable. Small cleaning members generally are solid, but cleaning members of larger dimensions preferably are hollow, because they should not be too heavy, as they then tend to get stuck in the pipe.

We claim:

1. The combination of an endless pipe having an inlet and an outlet for a liquid medium, a cleaning member in said pipe, the pipe having a bent form allowing the cleaning member to circulate constantly through the pipe and past said inlet and outlet, said outlet having a smaller capacity than said inlet whereby part of said medium is returned from the outlet through a return portion of the pipe to and past said inlet for recycling, and means for supplying said medium under pressure to the inlet to cause the cleaning member, arriving by flow of said medium part through said return portion, to be pushed forward through the pipe.

2. The combination of claim 1, comprising also a pump communicating with said pipe and operable to increase the flow velocity of said medium circulating through the pipe.

3. The combination of claim 1, in which the pipe has a perforated part located downstream from said inlet for discharging liquid from the pipe while retaining said member in the pipe, the combination comprising also a conduit leading from said perforated part, and a pump having its inlet connected to said conduit, the outlet of the pump being connected to said inlet of the pipe.

4. The combination of claim 1, in which the endless pipe is divided into two parts, the combination comprising also a first end piece having bores in which the ends of one of said pipe parts are sealed, a second end piece having bores in which the ends of the other pipe part are sealed, and means for clamping said end pieces together to place said pipe parts in communication with each other, said end pieces forming a chamber at the region of said pipe outlet, said chamber having an outlet channel.

5. The combination of claim 4, comprising also a perforated tube piece in said chamber and interconnecting opposed ends of said pipe parts.

6. The combination of claim 1, in which said supply means include a member providing an ejecting action to induce flow through said return portion.

References Cited

UNITED STATES PATENTS

| 2,948,143 | 8/1960 | Pruitt | 15—3.51 X |
| 2,948,144 | 8/1960 | Applequist | 15—3.51 X |
| 3,288,163 | 11/1966 | Craven | 15—3.51 X |

FOREIGN PATENTS

| 681,642 | 9/1939 | Germany. |

EDWARD L. ROBERTS, *Primary Examiner.*

U.S. Cl. X.R.

137—268